United States Patent
Kamata

(10) Patent No.: US 10,044,293 B2
(45) Date of Patent: Aug. 7, 2018

(54) HIGH-VOLTAGE INVERTER

(71) Applicant: Hisahiro Kamata, Kanagawa (JP)

(72) Inventor: Hisahiro Kamata, Kanagawa (JP)

(73) Assignee: Ricoh Company, LTD., Tokyo (JP)

( * ) Notice: Subject to any disclaimer, the term of this patent is extended or adjusted under 35 U.S.C. 154(b) by 139 days.

(21) Appl. No.: 14/204,112

(22) Filed: Mar. 11, 2014

(65) Prior Publication Data
US 2014/0268966 A1    Sep. 18, 2014

(30) Foreign Application Priority Data

Mar. 14, 2013 (JP) .................................. 2013-052272

(51) Int. Cl.
*H02M 7/537* (2006.01)
*H02M 1/00* (2006.01)
(Continued)

(52) U.S. Cl.
CPC .............. *H02M 7/537* (2013.01); *H01F 3/14* (2013.01); *H01F 29/10* (2013.01); *H02M 2001/0077* (2013.01)

(58) Field of Classification Search
CPC .......... H02M 7/537; H02M 2001/0077; H01F 27/24
(Continued)

(56) References Cited

U.S. PATENT DOCUMENTS 2,879,489 A * 3/1959 Mitchell ................. H01F 29/10
336/134
4,980,811 A * 12/1990 Suzuji ............... H02M 3/33561
323/250
(Continued)

FOREIGN PATENT DOCUMENTS

JP       06-231975      8/1994
JP     2002-237377      8/2002
(Continued)

OTHER PUBLICATIONS

Zia Yamayee, Electromechanical Energy Devices and Power System, 1993, Wiley, First edition, p. 156.*
(Continued)

*Primary Examiner* — Adolf Berhane
*Assistant Examiner* — Bart Iliya
(74) *Attorney, Agent, or Firm* — Harness, Dickey & Pierce, P.L.C.

(57) ABSTRACT

An inverter includes transformers having identical characteristics. Exciting windings of the transformers are connected in parallel so that the transformers are excited simultaneously. Output windings of the transformers are connected in series so that waveforms of output voltages of the output windings are time-synchronized. Each transformer includes a core having an identical shape and including an inner leg having an independent closed magnetic circuit. The excitation winding and the output winding are wrapped around the inner leg of the core in layers. The inner leg of the core has a gap whose size is steplessly adjustable in a state where the excitation current is applied to the excitation winding. The size of the gap is adjusted to regulate exciting inductances of the transformers to a same predetermined value.

16 Claims, 8 Drawing Sheets

(51) Int. Cl.
*H01F 3/14* (2006.01)
*H01F 29/10* (2006.01)

(58) Field of Classification Search
USPC .......................................................... 363/131
See application file for complete search history.

(56) References Cited

U.S. PATENT DOCUMENTS

| | | | |
|---|---|---|---|
| 5,053,738 A * | 10/1991 | Sato | H01F 38/10 336/165 |
| 5,122,947 A * | 6/1992 | Hishiki | H01F 27/346 323/362 |
| 5,559,486 A | 9/1996 | Ikenoue et al. | |
| 5,757,628 A | 5/1998 | Kamata | |
| 2006/0049903 A1* | 3/2006 | Wolfgram | H01F 27/2823 336/180 |
| 2009/0001944 A1 | 1/2009 | Kim et al. | |
| 2009/0273738 A1 | 11/2009 | Fukumoto | |
| 2010/0321141 A1* | 12/2010 | Chen | H01F 29/10 336/131 |
| 2010/0321146 A1* | 12/2010 | Zhang | H01F 17/062 336/229 |
| 2011/0235382 A1* | 9/2011 | Kamata | H02M 7/48 363/131 |
| 2012/0163058 A1 | 6/2012 | Kamata | |
| 2012/0236614 A1 | 9/2012 | Kamata | |
| 2014/0140111 A1* | 5/2014 | Inaba | H01F 37/00 363/37 |

FOREIGN PATENT DOCUMENTS

| | | |
|---|---|---|
| JP | 2005-085940 | 3/2005 |
| JP | 2005-123299 | 5/2005 |
| JP | 2009-011144 | 1/2009 |
| JP | 2012049238 A | 3/2012 |
| JP | 2012-135112 | 7/2012 |
| JP | 2012-143058 | 7/2012 |
| JP | 2012-186984 | 9/2012 |
| JP | 2012-191828 | 10/2012 |
| JP | 2012239288 A | 12/2012 |
| WO | 2007-060941 | 5/2007 |

OTHER PUBLICATIONS

U.S. Appl. No. 07/709,302, filed Jun. 3, 1991.
U.S. Appl. No. 07/981,481, filed Nov. 25, 1992.
U.S. Appl. No. 08/302,483, filed Sep. 12, 1994.
Japanese Office Action dated Dec. 20, 2016 issued in corresponding Japanese Patent Application No. 2013-052272.

* cited by examiner

HIGH-VOLTAGE INVERTER

CROSS-REFERENCE TO RELATED APPLICATION

The present application claims priority to and incorporates by reference the entire contents of Japanese Patent Application No. 2013-052272 filed in Japan on Mar. 14, 2013.

BACKGROUND OF THE INVENTION

1. Field of the Invention

The present invention relates generally to an inverter.

2. Description of the Related Art

High-voltage inverters that output high alternating current (AC) voltages are in extensive use as plasma-discharge power supply devices for plasma generators, discharge tubes of large plasma displays, ozone generators, and the like.

For instance, atmospheric-pressure plasma generated by dielectric barrier discharge is applied to various industrial products as one of surface treatments for improving surface quality, removing contaminants, and the like. Giving pretreatment using the atmospheric pressure plasma to a resin or the like before adhesion, printing, coating, or the like is applied to the resin can improve wettability of the surface of the resin, thereby facilitating and giving a desirable finish of the adhesion, printing, coating, or the like.

To generate dielectric barrier discharge that produces such atmospheric-pressure plasma stably, it is necessary to stably supply high AC voltage power of several kilovolts (kV) to several tens of kV across a discharge electrode and a counter electrode, which face each other with a dielectric of a discharger therebetween, using a high-voltage inverter.

General switching regulators (AC-DC or DC-DC converters) that output power of approximately several watts (W) are commonly used. However, a high-voltage inverter delivering AC output power of several tens of W or higher with an output voltage of over ten kV is used in a plasma generator or the like.

In a general switching regulator, a direct current (DC) voltage is intermittently applied to a primary excitation winding of a voltage-converting transformer by switching the DC voltage using a switching device, thereby generating an AC current in a secondary output winding of the transformer. The AC current is rectified and smoothed to output a DC voltage.

The output voltage is maintained at a constant voltage by, for example, performing pulse width modulation (PWM) control that controls a ratio (duty ratio) between "on" period and "off" period of a switching device. The PWM control may be performed by detecting an output voltage and generating a feedback voltage based on the detected voltage as disclosed in Japanese Laid-open Patent Application No. 2009-11144, for example.

More specifically, the output voltage is maintained constant by, when the output voltage decreases, increasing the "on" period to compensate for a shortage in output power, while, when the output voltage increases, reducing the "on" period to prevent excessive increase in output power.

An inverter operates in a similar manner as follows. A DC voltage is intermittently applied to a primary excitation winding of a voltage-converting transformer by switching the DC voltage using a switching device. An AC current generated in a secondary output winding is applied as it is to a load.

Some type of such an inverter is configured as follows as disclosed in published Japanese translation of PCT application No. 2007/060941, for example. An output current, rather than the output voltage, is detected, and the detected current is converted to a voltage. A switching device of the inverter is PWM-controlled based on the converted voltage.

To generate dielectric barrier discharge that produces the atmospheric-pressure plasma described above stably, it is necessary to stably supply AC power of high voltage of several kV to several tens of kV. The inventor has already developed a high-voltage inverter appropriate for such a use. An example of the high-voltage inverter is disclosed in Japanese Laid-open Patent Application No. 2012-186984.

A basic configuration of the high-voltage inverter is illustrated in FIG. 14. A switching device Q switches an input voltage Vin, which a DC voltage or a voltage consisting of a DC component and a pulsating current superimposed thereon, to apply an excitation current to a primary excitation winding of a resonant transformer 3. As a result, an output voltage Vout, which is a high AC voltage, is output from a secondary output winding of the resonant transformer 3.

A feature of the high-voltage inverter is that the voltage-converting resonant transformer 3 is made up of a plurality of (in the example illustrated in FIG. 14, two) transformers T1 and T2 that have identical characteristics. Excitation windings Np1 and Np2 of the plurality of transformers T1 and T2 are parallel-connected so as to be excited simultaneously. Output windings Ns1 and Ns2 of the transformers T1 and T2 are series-connected and output a voltage, into which output voltages of the output windings Ns1 and Ns2 are added up. For this purpose, the output voltages from the output windings Ns1 and Ns2 are controlled so as to have time-synchronized waveforms.

FIG. 15 illustrates waveforms of a switching signal Sp, an electric current Id(Q) between the source and the drain of the switching device Q embodied in a field-effect transistor (FET), the output voltage Vout, and an output current Io to be applied to a load in the high-voltage inverter.

The switching signal Sp is a pulse-width-modulated (PWMed) rectangular pulse signal generated by a control circuit (not shown) and applied to the gate of the switching device Q. In one full cycle, the switching device Q is switched on during a high period of the switching signal Sp, while the switching device Q is switched off during a low period.

During the period when the switching device Q is on, the electric current Id(Q) is applied to the excitation windings Np1 and Np2 of the transformers T1 and T2 simultaneously. During this period, energy is stored in the transformers T1 and T2. When the switching device Q is switched off, the energy stored in the transformers T1 and T2 is drained therefrom, generating a sine-halfwave-like pulsating high voltage in each of the output windings Ns1 and Ns2. The high voltages generated in the output windings Ns1 and Ns2 are added up into the output voltage Vout.

The high-voltage inverter illustrated in FIG. 14 is also a flyback voltage resonant inverter. Accordingly, as described above, the high-voltage inverter operates as follows. During a period when the switching device Q is on, excitation energy is stored in the excitation windings Np1 and Np2 of the transformers T1 and T2. During a period when the switching device Q is off, the output voltage Vout, which is a high AC voltage, is output from the output windings Ns1 and Ns2. The output voltage Vout is applied across electrodes of a load, which can be a discharger 4, for example.

Note that the term "high AC voltage" as used herein denotes a high voltage having a pulse-like or pulsating alternating waveform derived from a flyback pulse generated in the output windings by on/off of the excitation current applied to the transformers rather than a high voltage having a sine-wave alternating current that is symmetrical about the zero-volt axis.

The output voltage Vout is generated by a parallel resonant circuit that includes a total inductance Ls of the output windings Ns1 and Ns2, and a combined capacitance of a total distributed capacitance Cs and an equivalent capacitance (load capacitance) Co of the discharger 4, which is the load. Accordingly, the output voltage Vout depends on a turns ratio between the excitation windings Np1 and Np2 and the output windings Ns1 and Ns2; nevertheless, the output voltage Vout is a high voltage of which stepup ratio with respect to the input voltage Vin is considerably higher than the turn ratio.

Configuring the high-voltage inverter in this way allows the number of windings of the output windings of the entire resonant transformer 3 to increase without causing DC magnetization to occur in the excitation windings Np1 and Np2 of the transformers T1 and T2. As a result, a high voltage can be obtained with a high stepup ratio continuously, stably, and safely.

Dielectric barrier discharge (also referred to as silent discharge) that generates atmospheric-pressure plasma may generally generate atmospheric-pressure plasma by application of a voltage of 6 kV or higher at normal pressure. Resonant constants of a secondary parallel resonant circuit of the resonant transformer 3 illustrated in FIG. 14 are Ls, Cs, and Co, where Co is an equivalent capacitance between the facing electrodes that generate dielectric barrier discharge in the discharger 4. This resonance place an output line in a high magnetic field. As a result, a waveform of the output voltage is distorted out of a fundamental waveform. Fourier expansion of the waveform gives alternating, attenuating high-order harmonic voltages.

Meanwhile, the total inductance Ls and the total distributed capacitance Cs, both of which are the resonant constants, are combined characteristics of the plurality of transformers T1 and T2 of which magnetic circuits are separate. When the number of the transformers is two, the output inductance and the distributed capacitance of each of the transformers T1 and T2 are substantially Ls/2 and substantially 2·Cs, respectively. The output voltage Vout is an alternating voltage that ranges from several kV to several tens of kV. An average output power is in the range from several W to several tens of kW.

Accordingly, the fundamental wave, which is expressed by $V_{out}(t)=(\sqrt{2}V_{out})\sin(\omega t)$, of the output voltage Vout follows a sine wave function. Vout is an effective value of the output voltage.

To control peak values of this alternating voltage, it is desirable to control the peak values without time lag and with pinpoint accuracy.

However, in practice, it is difficult to detect the peak values with pinpoint accuracy because the voltage is an alternating high voltage ranging to several tens of kV. Furthermore, even if signal detection succeeds, at least a few milliseconds (msec) takes until the switching device that performs power conversion is driven. This repeatedly occurs at switching frequency.

Therefore, the peak values of the output voltage undesirably have an output voltage waveform that is suppressed every the at least a few msec.

PWM control is applicable to a switching regulator that outputs a DC output voltage. More specifically, as disclosed in Japanese Laid-open Patent Application No. 2009-11144, a switching pulse, based on which a switching device is to be on/off-controlled, can be PWM-controlled by detecting an output voltage of the switching regulator.

Furthermore, in such a switching regulator, control responsiveness does not matter. This is because an electrolytic capacitor or the like of a smoothing circuit connected to an output side provides holding time.

In contrast, because the inverter outputs a high AC voltage, it is difficult to control peak values (peak voltage values) of the output voltage irrespective of either a full wave or a half wave.

Reasons therefor are: i) duration of the peak value is instantaneous, and ii) the higher the output voltage waveform's frequency, the greater the delay in control affects, resulting in excessive drop or rise of the peak value.

When the inverter outputs an alternating voltage, has a high switching frequency of several tens of kilohertz (kHz), and has high output peak values of over ten kV, not only the control responsiveness problem described above but also problems of withstand voltages of an output voltage detector and components and the like arise.

Due to these reasons, it is general to control only an input supply voltage constant but not to control output voltage values in such a high-voltage inverter.

As described in published Japanese translation of PCT application No. 2007/060941 that is denoted above, there is a technique of detecting an output current, rather than the output voltage, and performing PWM control on a switching device by feeding back the detected output current. However, this technique does not enable monitoring and controlling peak values of the output voltage.

Therefore, there is a need for a technique that allows adjusting peak values of an output voltage from such a high-voltage inverter that outputs a high alternating voltage peaking at over ten kV to a desired value easily.

SUMMARY OF THE INVENTION

It is an object of the present invention to at least partially solve the problems in the conventional technology.

According to an embodiment, there is provided an inverter that includes a transformer including a primary excitation winding to which an excitation current obtained by switching an input voltage is applied, and a secondary output winding from which an alternating-current voltage is output. The transformer includes a plurality of transformers having identical characteristics, exciting windings of the transformers functioning as primary excitation winding and being connected in parallel so that the transformers are excited simultaneously, output windings of the transformers functioning as the secondary output winding and being connected in series so that waveforms of output voltages of the output windings are time-synchronized. Each of the transformers includes a core having an identical shape and including an inner leg having a independent closed magnetic circuit. The excitation winding and the output winding are wrapped around the inner leg of the core in layers. The inner leg of the core has a gap whose size is steplessly adjustable in a state where the excitation current is applied to the excitation winding. The size of the gap is adjusted to regulate exciting inductances of the transformers to a same predetermined value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are specifically described below with reference to the accompanying drawings.

Figure 14:
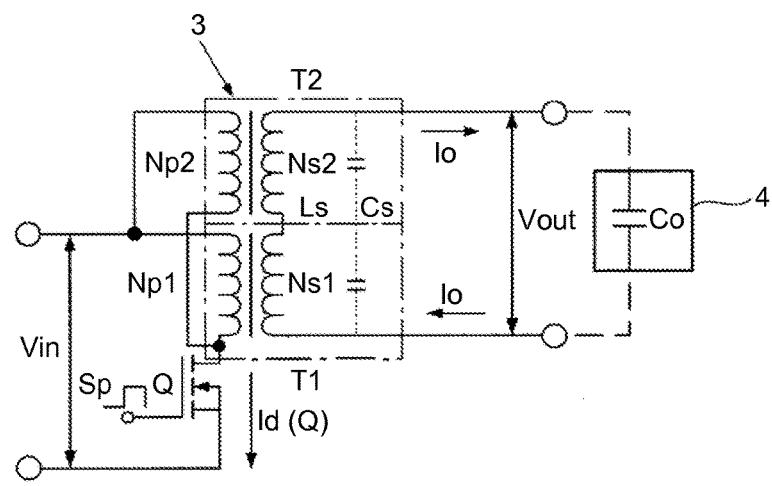
FIG. 14 is a circuit diagram illustrating a configuration of an example conventional high-voltage inverter, to which the present invention may be directed.

First, a configuration of a high-voltage inverter according to an embodiment of the present invention is described with reference to FIGS. 1 and 2. The high-voltage inverter of the embodiment is basically identical in configuration with the high-voltage inverter described above with reference to FIG. 14. However, in contrast to the high-voltage inverter described above, a voltage-converting resonant transformer of the high-voltage inverter of the embodiment is made up of four discrete transformers that have identical characteristics.

It is required of a high-voltage inverter for use in an atmospheric-pressure plasma generator for surface modification or the like to raise a voltage using a large transformer or the like to stably deliver a high output voltage. However, increasing a turns ratio between an excitation winding and an output winding of the transformer to obtain a high output voltage involves problems. The problems include: an increase in loss and reduction in usable frequency range resulting from an increase in winding resistance and winding-to-winding capacitance; magnetic saturation of a core; and heat from the core and the windings.

In view of these, the high-voltage inverter of the embodiment includes a resonant transformer 10 made up of four discrete transformers T1 to T4, and delivers a high voltage or high power by exciting the transformers T1 to T4 simultaneously and adding up outputs from the transformers T1 to T4.

Figure 1:
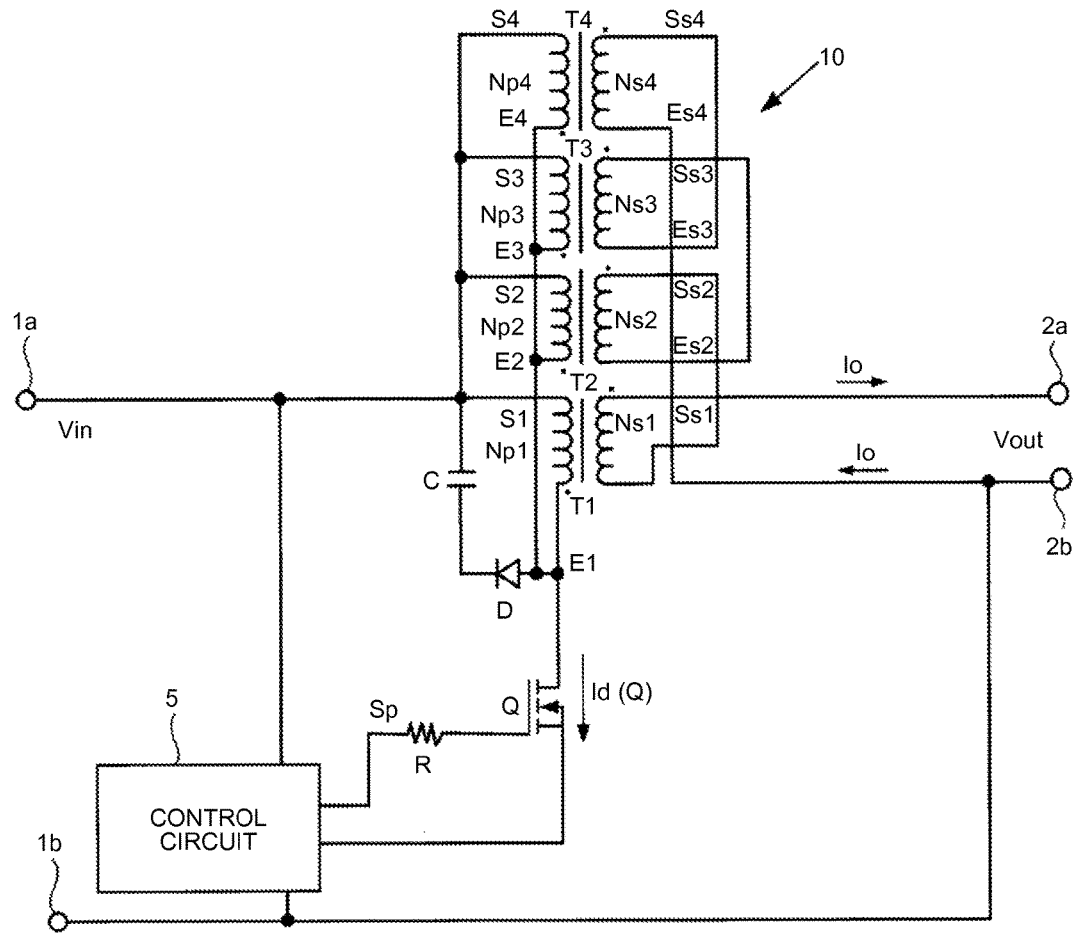
FIG. 1 is a circuit diagram illustrating a configuration of a high-voltage inverter according to an embodiment.

The high-voltage inverter illustrated in FIG. 1 is supplied with an input voltage Vin through input terminals 1a and 1b. The input voltage yin is a DC voltage or a voltage consisting of a DC component and a pulsating current superimposed thereon not exceeding safety extra-low voltage (SELV). The switching device Q performs switching of the input voltage Vin, thereby intermittently applying an excitation current to primary excitation windings Np1 to Np4 of the four transformers T1 to T4 that make up the resonant transformer 10.

Consequently, high voltages are respectively output from secondary output windings Ns1 to Ns4 of the transformers T1 to T4. The output voltages are added up and output as the output voltage Vout, which is a high AC voltage, at output terminals 2a and 2b. When a load such as a discharger is connected across the output terminals 2a and 2b, the output current Io flows through an output circuit to the load.

The input voltage yin is obtained by rectifying and smoothing an AC from a commercial power supply (in Japan, 50-Hz or 60-Hz AC with an effective voltage of 100 V) with a rectifier circuit and a smoothing circuit, respectively.

The transformers T1 to T4 that make up the resonant transformer 10 are discrete transformers that have identical characteristics. The excitation windings Np1 to Np4 of the transformers T1 to T4 are parallel-connected. The transformers T1 to T4 are connected across the input terminals 1a and 1b in series with the drain-source connection of the switching element Q, which is embodied in the FET. The output windings Ns1 to Ns4 of the transformers T1 to T4 are series-connected, and opposite ends of the output windings Ns1 to Ns4 are connected to the output terminals 2a and 2b. Grounded terminals are also connected to the negative input terminal 1b.

Hereinafter, the excitation windings Np1 to Np4 may collectively referred to as the excitation windings Np; the output windings Ns1 to Ns4 may collectively referred to as the output windings Ns.

A capacitor for eliminating DC components may be inserted to an output line extending from the output terminal 2a.

A control circuit 5 is a control integrated circuit (IC) including an oscillation circuit and operates on the input voltage Vin. The control circuit 5 applies the switching signal Sp, which is a rectangular pulse, to the gate of the switching device Q via a protective resistor R, thereby switching on/off the switching device Q.

Consequently, the current Id(Q) intermittently flows across the source and the drain of the switching device Q, causing the current to intermittently flow through the excitation windings Np of the resonant transformer 10. As a result, a high voltage having a pulse waveform is generated in each of the output windings Ns. The high voltages are added up into the output voltage Vout, which is a high AC voltage.

Figure 15:
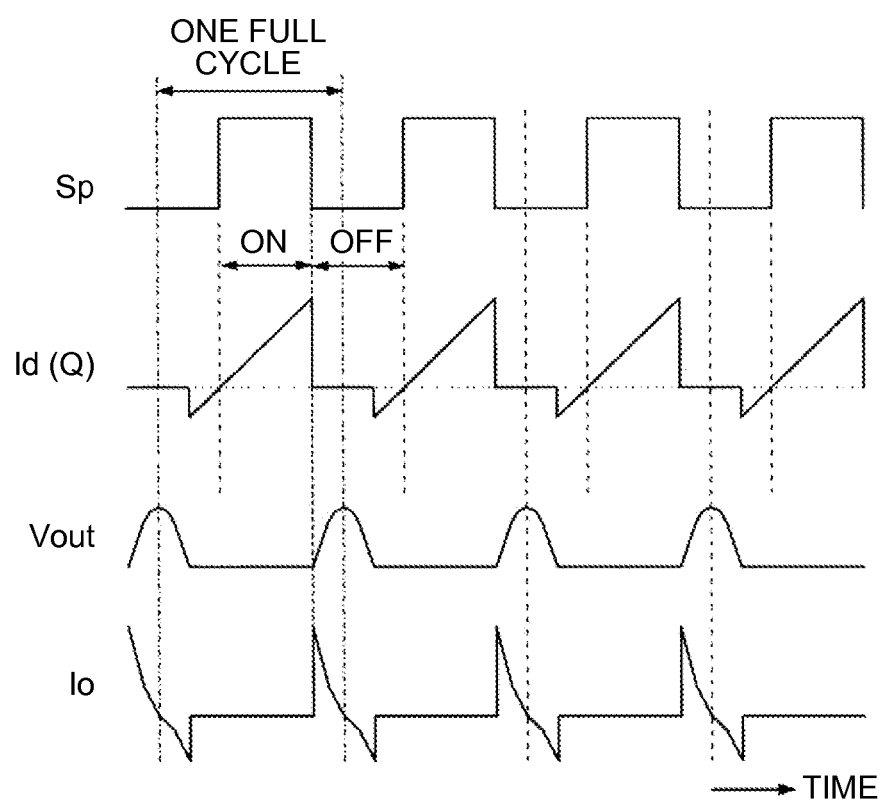
FIG. 15 is a circuit diagram for describing operations of the high-voltage inverter illustrated in FIG. 14.

Waveforms of the switching signal Sp, the electric current Id(Q) flowing through the switching device Q, the output voltage Vout, and the output current Io, which is obtained when a load is connected, are similar to those of the example illustrated in FIG. 15.

The switching device Q is connected such that the drain is connected to one end of the excitation windings Np of the resonant transformer 10, and the source is connected to the negative input terminal 1b in the control circuit 5.

A series circuit of a capacitor C and a diode D that are connected in shunt with the excitation windings Np of the resonant transformer 10 forms a snubber circuit. The snubber circuit is provided to reset the transformers T1 to T4 and to limit the voltage across the switching device Q.

In the high-voltage inverter, excitation energy is stored in the excitation windings Np1 to Np4 of the transformers T1 to T4 of the resonant transformer 10 during a period when the switching device Q is on.

During a period when the switching device Q is off, the transformers T1 to T4 let the stored energy be drained to output sine-halfwave-like pulsating high voltages to the output windings Ns1 to Ns4. The voltages are added up into the output voltage Vout.

The output voltage Vout is generated by a parallel resonant circuit having a combined inductance of the output windings Ns1 to Ns4 of the transformers T1 to T4, and a combined capacitance of distributed capacitances of the output windings Ns1 to Ns4 and an equivalent capacitance (load capacitance) of a load. These inductances and distributed capacitances are not illustrated in the drawings.

The output voltage Vout is raised relative to the input voltage Vin depending on the turns ratio between the excitation windings Np1 to Np4 of the transformers T1 to T4 of the resonant transformer 10 and the output windings Ns1 to Ns4, a Q factor that indicates sharpness of resonance, and n, the number of the transformers.

The output voltages from the output windings Ns1 to Ns4 of the transformers T1 to T4 are to have time-synchronized waveforms. Accordingly, it is desirable that not only the transformers T1 to T4 have identical characteristics but also the switching device Q is arranged so as to make lengths of connecting lines from the drain terminal of the switching device Q to the negative terminals of the excitation windings Np of the transformers substantially equal to one another.

The high-voltage inverter includes at least four transformers, which have identical characteristics, with cores having mutually independent magnetic circuits. The high-voltage inverter excites the excitation windings simultaneously, and adds or multiplies output voltages from the output windings on the output side. Because the number of windings of the output windings can thus be increased without causing DC magnetization to occur in the plurality of excitation windings, the high-voltage inverter can deliver a high voltage with a high stepup ratio continuously, stably, and safely.

Therefore, the same output voltage can be obtained with a lower voltage per transformer, with a lower voltage applied across an exciting side (i.e., the switching device Q) and, accordingly, with less heat loss. Furthermore, magnetic saturation in the transformers can also be prevented.

Power of a still higher voltage can be obtained from such a high-voltage inverter by further increasing the number of the transformers that make up the resonant transformer 10.

Figure 2:
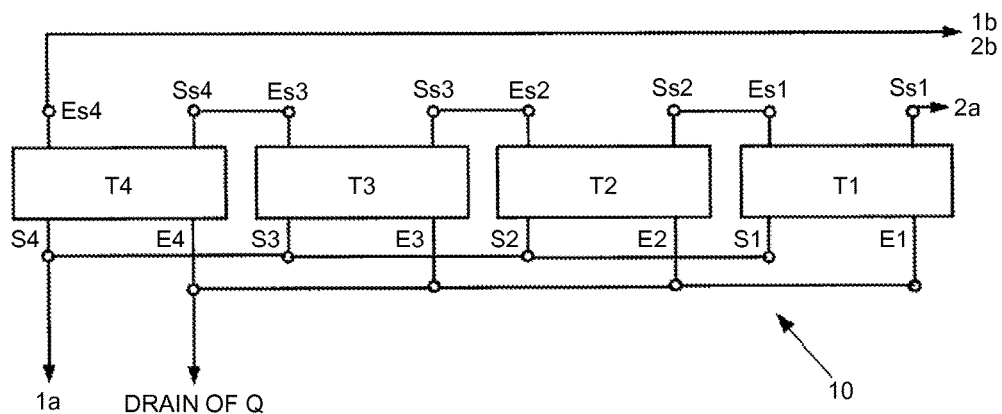
FIG. 2 is a plan view schematically illustrating an example of arrangement of and connection between transformers of a resonant transformer of the high-voltage inverter illustrated in FIG. 1.

FIG. 2 is a plan view schematically illustrating an example of arrangement of and connection between the four transformers of the resonant transformer 10 of the high-voltage inverter illustrated in FIG. 1.

The cores of the transformers T1 to T4 are identical in shape and respectively include inner legs that respectively have mutually-independent closed magnetic circuits. The excitation winding Np and the output winding Ns are wrapped in layers around the inner leg of each core. The transformers T1 to T4 are depicted in a simplified form in the plan view of FIG. 2.

Winding starts of the excitation windings Np1 to Np4 of the transformers T1 to T4 are denoted by S1 to S4, respectively. Winding ends of the same are denoted by E1 to E4, respectively. Winding starts of the output windings Ns1 to Ns4 of the transformers T1 to T4 are denoted by Ss1 to Ss4, respectively. Winding ends of the same are denoted by Es1 to Es4, respectively.

The transformers T1 to T4 are arranged in a line in the lengthwise direction. The winding starts S1 to S4 of the excitation windings Np1 to Np4 are common connected to the input terminal 1a. The winding ends E1 to E4 of the same are common connected to the drain of the switching device Q.

The winding start Ss1 of the output winding Ns1 of the transformer T1 is connected to the output terminal 2a. The winding end Es1 of the output winding Ns1 is connected to the winding start Ss2 of the output winding Ns2 of the transformer T2. The winding end Es2 of the output winding Ns2 is connected to the winding start Ss3 of the output winding Ns3 of the transformer T3. The winding end Es3 of the output winding Ns3 is connected to the winding start Ss4 of the output winding Ns4 of the transformer T4. The winding end Es4 of the output winding Ns4 is connected to the input terminal 1b and the output terminal 2b.

The present embodiment aims at obtaining high output power of several tens of W to several kW with a high voltage of several kV to several tens of kV with small fluctuations in the output voltage by performing switching of an input voltage, which is AC, DC, or DC with a pulsating current superimposed thereon.

To that end, an excitation current is applied to each of excitation windings of a plurality of transformers, and peak current values of the current Id(Q) exhibiting such a substantially-right-triangular waveform as illustrated in FIG. 15 are adjusted. More specifically, a peak current value of the excitation current Id(Q) is controlled by monitoring time, during which the excitation current is applied, and the value of an exciting inductance and the input voltage Vin that determine a hypotenuse (a slope of the plot of the current Id(Q)) of the right triangle. By adopting this control, a high-voltage inverter with small fluctuations in output voltage can be provided.

Figure 3:
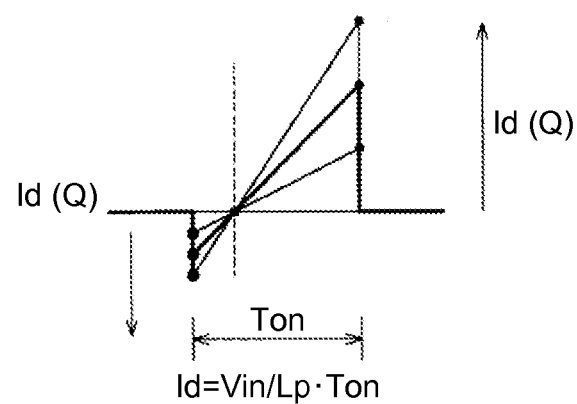
FIG. 3 is a model diagram of an excitation current applied to the transformer.

FIG. 3 is a model diagram of an excitation current applied to a transformer. In FIG. 3, Id(Q) denotes the excitation current applied to the transformer; Ton denotes time during which the excitation current is applied.

In the example below, it is assumed that the number of employed transformers is four (the exciting inductance per transfer is denoted by Lp). Excitation energy ε stored in the four transformers is determined by a final value of the excitation current Id(Q) applied to the four transformers, and therefore can be obtained from the following Equation (I).

$$\varepsilon = 1/2 \cdot Lp/4 \cdot (Id(Q))^2 \quad (1)$$

Ton, which is the time from when the switching device Q is switched on to when the switching device Q is switched off, can be differentiated with respect to an infinitesimal time base. Accordingly, the final value of the excitation current Id(Q) applied to the excitation windings can be obtained from the following Equation (2).

$$Id(Q) = Vin/Lp \cdot Ton \quad (2)$$

Therefore, by substituting Equation (2) to Equation (1), the excitation energy ε can be obtained from the following Equation (3).

$$\varepsilon = 1/8 \cdot Lp \cdot (Vin \cdot Ton/Lp)^2 \qquad (3)$$
$$= (Vin \cdot Ton)^2/8Lp$$

The thus-obtained ε is the amount of energy stored in the four transformers in one switching period.

When the number of employed transformers is n, the excitation energy ε to be stored in the transformers can be obtained from the following Equation (4).

$$\varepsilon = (Vin \cdot Ton)^2/(2n \cdot Lp) \qquad (4)$$

The output voltage Vout depends on how the energy calculated using Equation (3) or Equation (4) is stored in the plurality of transformers that make up the resonant transformer 10. More specifically, so long as the time Ton, during which the excitation current is applied, illustrated in FIG. 3 is constant, the output voltage Vout depends on the slope of the hypotenuse of the right triangle that indicates the change in the excitation current Id(Q). In short, the output voltage Vout depends on Vin/Lp of Equation (2).

This slope determines the peak value (which is the height of an apex of the right triangle) of the excitation current Id(Q) and, accordingly, determines the peak value of the output voltage Vout.

Because Vin is the input voltage, the amount of the stored energy ε depends on 1/Lp. Meanwhile, Lp, which is the exciting inductance of each of the transformers, depends only on a linear portion of a characteristic curve of a maximum allowable DC bias NI (in ampere-turns (AT)). The maximum allowable DC bias NI is the product of N and I, where N is the number of turns (hereinafter, "winding turns") of the excitation winding, I is the excitation current. The exciting inductance Lp can also be calculated from Lp=AL·N2, where AL is an induction coefficient, and N is the winding turns of the excitation winding.

These values vary depending on a gap that serves as a magnetic resistance in a magnetic circuit of the transformer core. For instance, as the gap increases, the amount of storable magnetic energy increases, the value of the induction coefficient AL decreases, and the exciting inductance Lp also decreases.

Figure 4:
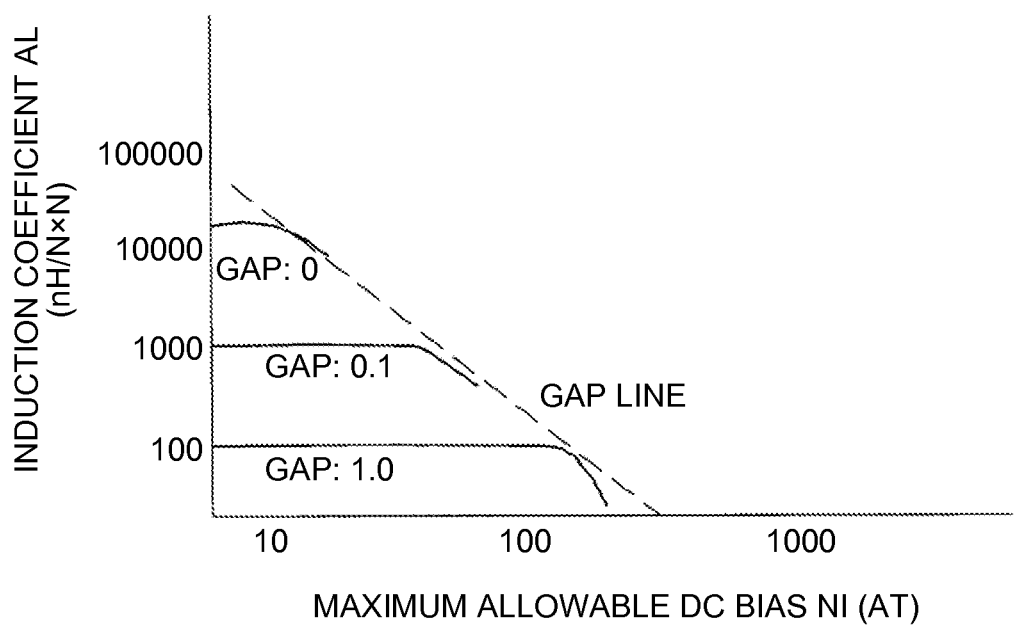
FIG. 4 is a characteristic curve of maximum allowable DC bias versus induction coefficient parameterized by core gap size.

FIG. 4 illustrates a characteristic curve of the maximum allowable DC bias NI (AT) versus the induction coefficient AL (nH/N×N) parameterized by gap size (gap length) in a core. "GAP: 0", "GAP: 0.1", and "GAP: 1.0" in FIG. 4 denote gap lengths in millimeters (mm).

Each of the transformers T1 to T4 of the resonant transformer 10 of the high-voltage inverter illustrated in FIGS. 1 and 2 includes a core with an inner leg that has a gap, of which size is adjustable.

As the gap size increases, magnetic saturation becomes less likely to occur. Consequently, the amount of applicable excitation current increases, and the maximum allowable DC bias NI (AT) can be increased. Because the value of the induction coefficient AL decreases, the amount of storable magnetic energy increases.

Figure 5:
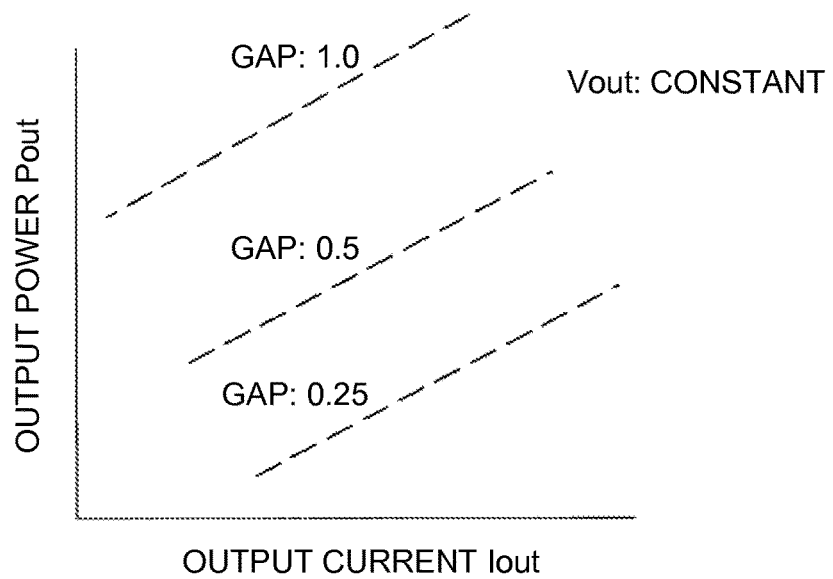
FIG. 5 is a curve diagram illustrating relationship between output current and output power parameterized by core gap size with output voltage held constant.

FIG. 5 is a characteristic curve illustrating relationship between an output current Iout and an output power Pout parameterized by the core gap size (gap length) with the output voltage held constant as in FIG. 4.

As will be apparent from FIG. 5, the larger the gap size, the larger the output current Iout and the output power Pout.

The high-voltage inverter according to the embodiment is configured to obtain desired output voltage and output power or, more specifically, a desired peak value, by adjusting core gaps of the transformers that make up the resonant transformer based on the characteristics described above.

The configuration of the transformers T1 to T4 of the resonant transformer 10 of the high-voltage inverter illustrated in FIGS. 1 and 2 is described below.

Figure 6:
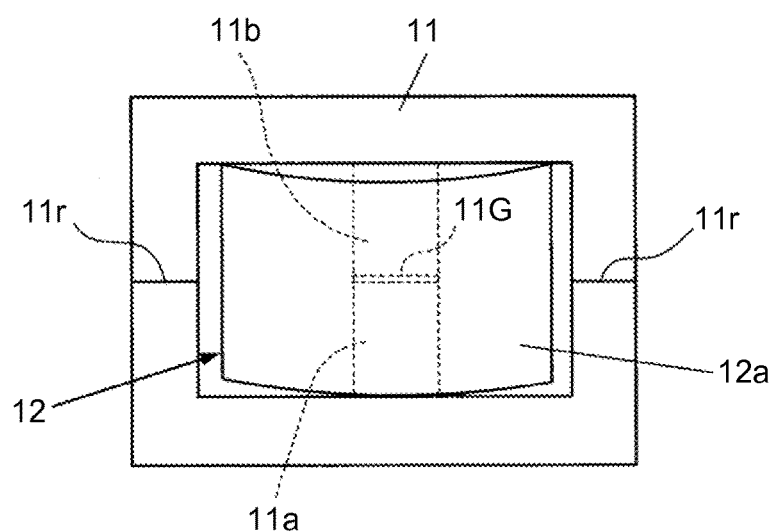
FIG. 6 is a schematic front view illustrating an example appearance of a transformer having two magnetic circuits.
Figure 7:
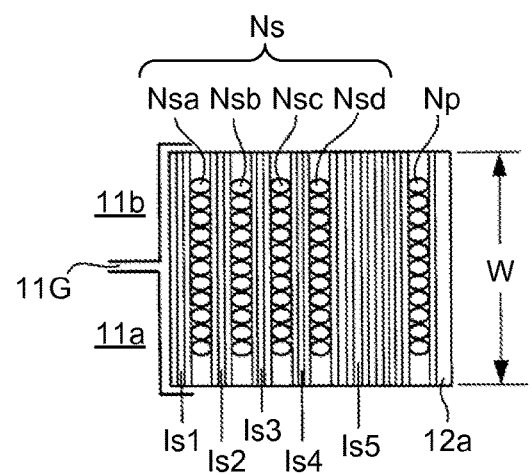
FIG. 7 is a vertical cross-sectional view illustrating a right half of the coil portion illustrated in FIG. 6.

FIG. 6 is a schematic front view illustrating an example appearance of a transformer having two magnetic circuits. A gap adjusting unit is not illustrated in FIG. 6. FIG. 7 is a vertical cross-sectional view of a right half of a coil portion of the transformer.

Referring to FIG. 6, a core 11 is an EE core or an EER core, which is made up of two E-shaped core members each with three legs, formed of a magnetic material such as ferrite. The core 11 is constructed by fixing together the core members with their three legs facing each other and with both side portions of the core members in close contact. This fixing is performed by encircling an outer perimeter of the core 11 with a band of a non-magnetic metal such as copper or aluminum and fixing the core members together. Close contact surfaces 11r on the both side portions can also be a magnetic resistance, but magnitude thereof is considerably small.

Inner legs 11a and 11b extend from a center portion of an upper side in FIG. 6 and a center portion of a lower side, respectively, of a rectangular frame of the core 11 in a direction toward each other and parallel to the other two sides of the frame. A gap 11G is provided between facing end surfaces of the inner legs 11a and 11b. The gap 11G provides most of the magnetic resistance and reduces magnetic flux saturation of the core 11.

It is preferable to mount a plastic bobbin (not shown) in advance in a manner to surround the inner legs 11a and 11b and coil a coil portion 12 on the bobbin.

As illustrated in the cross-sectional view of FIG. 7, for example, the coil portion 12 is coiled as follows. The output winding Ns is divided near the inner leg 11a of the core 11 into multiple-layer (in this example, four-layer) windings Nsa to Nsd that are substantially identical in winding width W and coiled in layers. Furthermore, the excitation winding Np having the same winding width W as that of the output winding Ns is wrapped externally around the winding Ns with a main insulating layer Eps, which is a dielectric, therebetween. Interlayer insulating layers Is1 to Is4 are respectively interposed between the winding Nsa which is the lowermost one of the layers, into which the output winding Ns is divided, and the inner legs 11a and 11b, and between each pair of adjacent layers.

As described above, the coil portion 12 is constructed by coiling the excitation winding Np and the output winding Ns around the inner legs 11a and 11b of the core 11 in layers.

More specifically, the winding Nsa, which is a first layer, of the output winding Ns is wrapped around the inner leg 11a of the core 11 with the insulating layer Is1 therebetween. The winding Nsb, which is a second layer, is wrapped around the winding Nsa with the insulating layer Is2 therebetween. The winding Nsc, which is a third layer, is wrapped around the winding Nsb with the insulating layer Is3 therebetween. The winding Nsd, which is a fourth layer, is wrapped around the winding Nsc with the insulating layer Is4 therebetween. The excitation winding Np is wrapped around the winding Nsd with the main insulating layer Is5 therebetween. Furthermore, in the embodiment, an insulating coating layer 12a is arranged externally on the excitation windings Np.

Each of the insulating layers Is1 to Is5 is formed by winding one or more sheets of fluoroplastic film tape in layers. The main insulating layer Is5 is larger in thickness than each of the insulating layer Is1 and the interlayer insulating layers Is2 to Is4.

Encircling the inner legs 11a and 11b that provide the gap 11G with the coil portion 12 in this manner causes leakage flux to be enclosed therein. As a result, leakage flux can be reduced.

Examples of a gap adjusting unit of the core 11 described above are described below with reference to FIGS. 8 to 13.

FIGS. 8 to 13 illustrate first to sixth examples of the core that has a gap adjusting unit. In FIGS. 8, 9, 10, 11, 12, and 13, (a) is a front view of the core. In FIGS. 8, 9, 10, 11, 12, and 13, (b) is a left side view of the same. In these diagrams, elements corresponding to those of FIG. 6 are denoted by like reference numerals and symbols. In FIGS. 8 to 13, mutually corresponding elements are denoted by like reference numerals and symbols.

The core 11 of each example is formed of a magnetic material such as ferrite. The core 11 includes a rectangular frame 110 and the cylindrical inner legs 11a and 11b. The frame 110 includes two frame side portions 111 and 112 that are parallel to each other. The inner legs 11a and 11b extend from center portions of the frame side portions 111 and 112 in a direction toward each other and parallel to the other two frame side portions.

The cylindrical inner leg 11a is a fixed inner-leg portion formed in one piece with the frame side portion 111, and hereinafter referred to as the fixed inner-leg portion 11a. The inner leg 11b that faces the fixed inner-leg portion 11a is a movable inner-leg portion screwed into the frame side portion 112, and hereinafter referred to as the movable inner-leg portion 11b.

The gap 11G is provided between facing end surfaces of the fixed inner-leg portion 11a and the movable inner-leg portion 11b. An end portion of the movable inner-leg portion 11b on the side not facing the fixed inner-leg portion 11a is operable to be rotated by an externally applied force.

To implement this configuration, in the first to fourth examples illustrated in FIGS. 8 to 11, a notch having concave curved surfaces 112a that face each other and fit an outer periphery of the movable inner-leg portion 11b is defined in a longitudinal center portion of the frame side portion 112. Internal threads 112b are formed in the concave curved surfaces 112a.

An external thread 11c is formed on an outer peripheral surface of the end portion of the movable inner-leg portion 11b on the side not facing the fixed inner-leg portion 11a.

Figure 12:
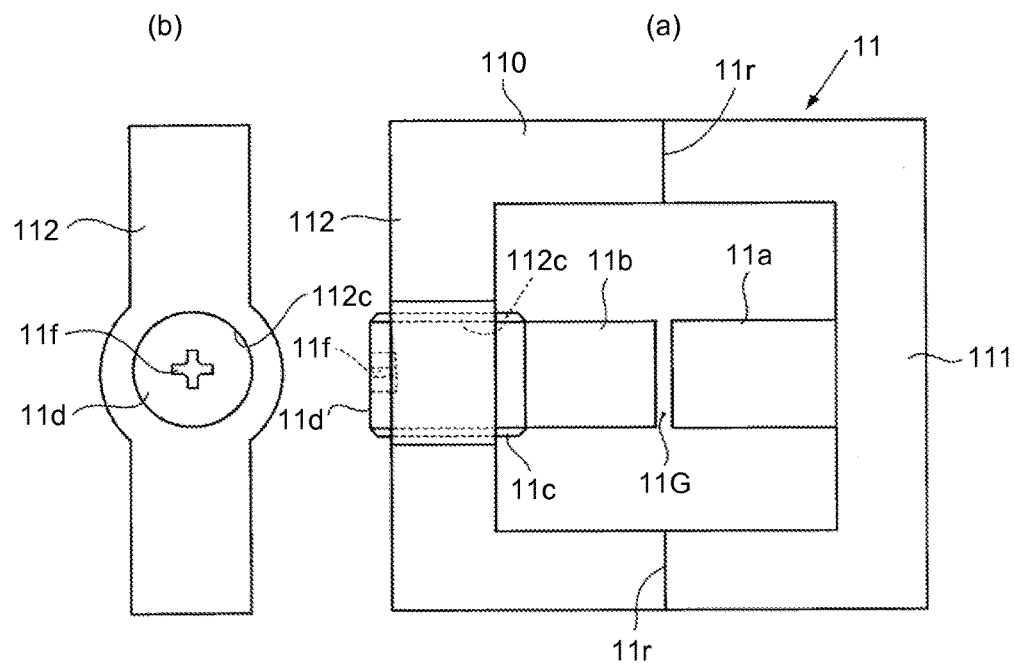
FIG. 12 illustrates front and left side views of the core including a gap adjusting unit according to a fifth example.
Figure 13:
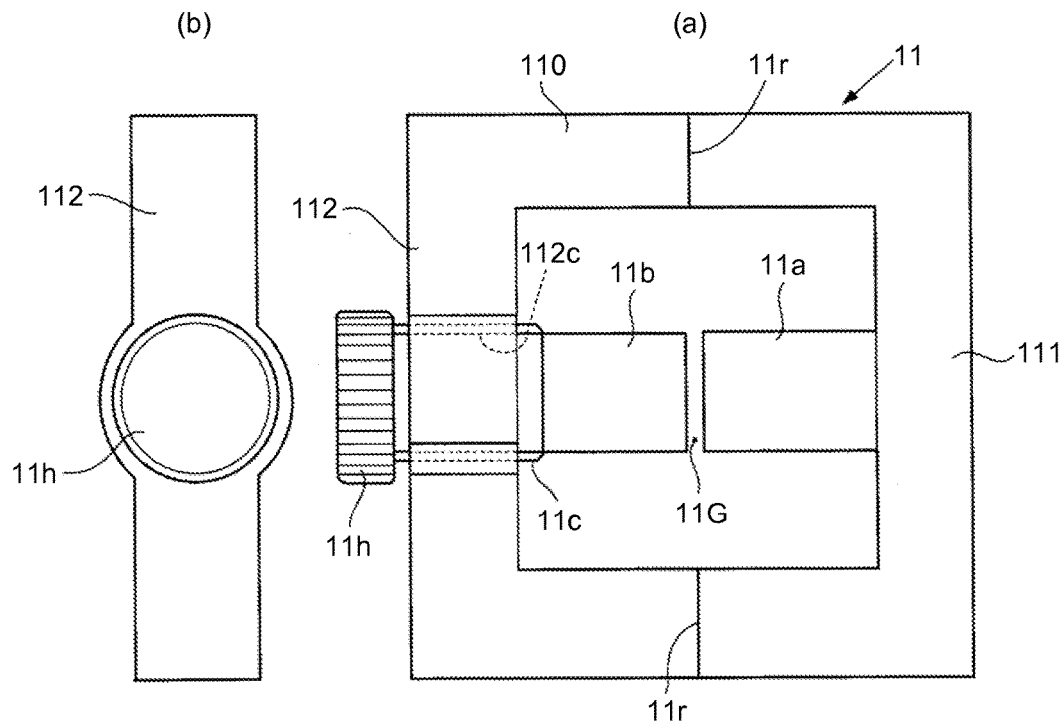
FIG. 13 illustrates front and left side views of the core including a gap adjusting unit according to a sixth example.

In the fifth and sixth examples illustrated in FIGS. 12 to 13, a longitudinal center portion of the frame side portion 112 is externally bulged in a width direction so as to have convex curved surfaces. A cylindrical internal thread 112c that fits the outer periphery of the movable inner-leg portion 11b is formed in the bulged portion. The external thread 11c is formed on the outer peripheral surface of the end portion of the movable inner-leg portion 11b on the side not facing the fixed inner-leg portion 11a.

Each of the first to sixth examples configured as described above allows screwing the movable inner-leg portion 11b into the side frame portion 112.

Figure 8:
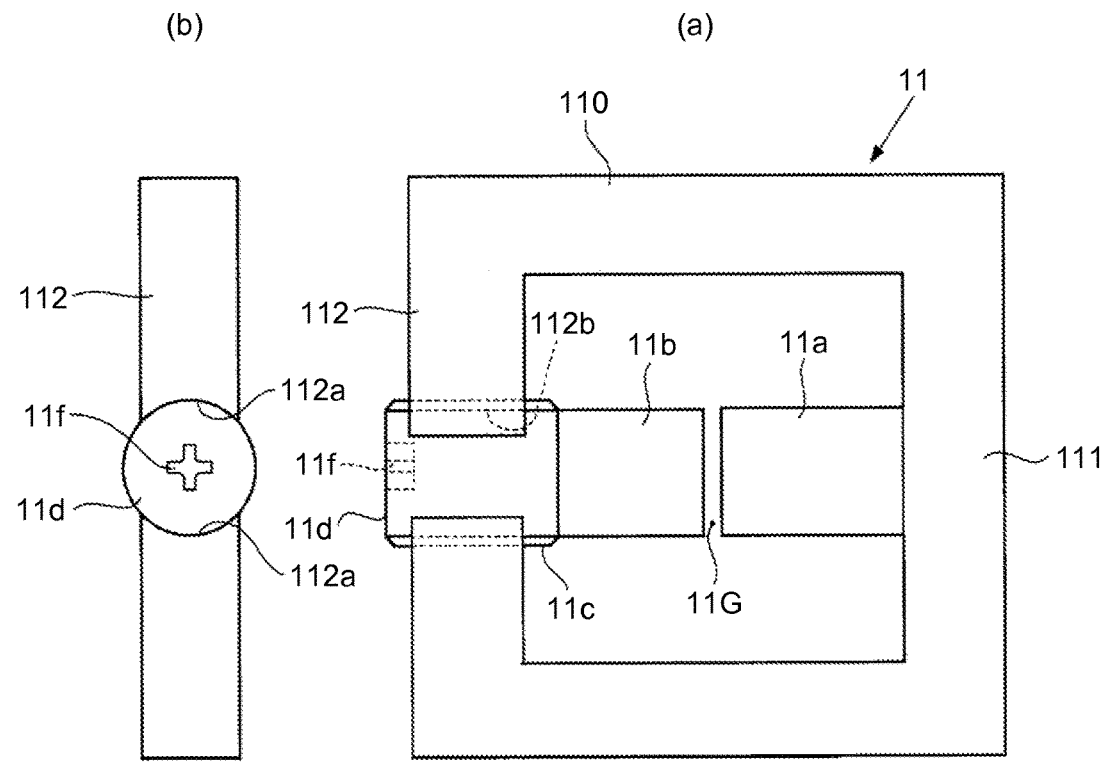
FIG. 8 illustrates front and left side views of a core including a gap adjusting unit according to a first example.
Figure 10:
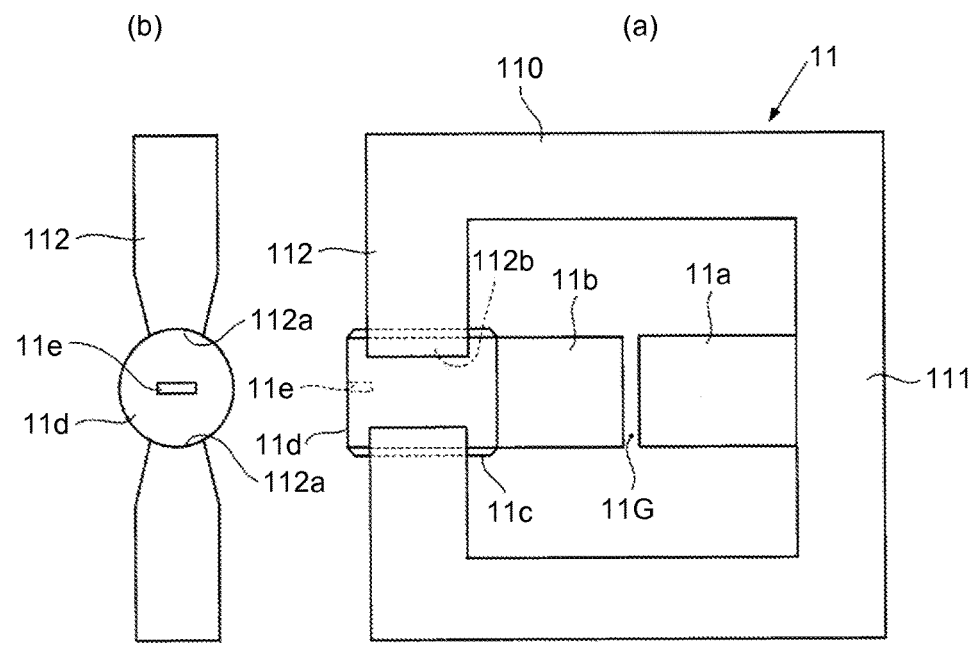
FIG. 10 illustrates front and left side views of the core including a gap adjusting unit according to a third example.

Furthermore in the first, third, and fifth examples illustrated in FIGS. 8, 10, and 12, a blade slot 11e, in which a flat-blade screwdriver can be fit, or a cross slot 11f, in which a Phillips screwdriver can be fit, is recessed in an end surface 11d of the end portion of the movable inner-leg portion 11b on the side not facing the fixed inner-leg portion 11a.

Although the cross slot 11f is recessed in the examples illustrated in FIGS. 8 and 12 and the blade slot 11e is recessed in the example illustrated in FIGS. 10A and 10B, any one of the blade slot and the cross slot may be employed by each of the examples. However, recessing the cross slot 11f, in which either a flat-blade screwdriver or a Phillips screwdriver can be fit, is preferable.

In the illustrated examples, the end surface 11d of the end portion of the movable inner-leg portion 11b on the side not facing the fixed inner-leg portion 11a slightly projects outward from an outer surface of the frame side portion 112. However, the end surface 11d does not necessarily project outward.

According to these examples, the size of the gap 11G (gap length) is adjustable by fitting either a flat-blade screwdriver or a Phillips screwdriver in the blade slot 11e or the cross slot 11f recessed in the end surface 11d of the movable inner-leg portion 11b and rotating the movable inner-leg portion 11b.

Figure 9:
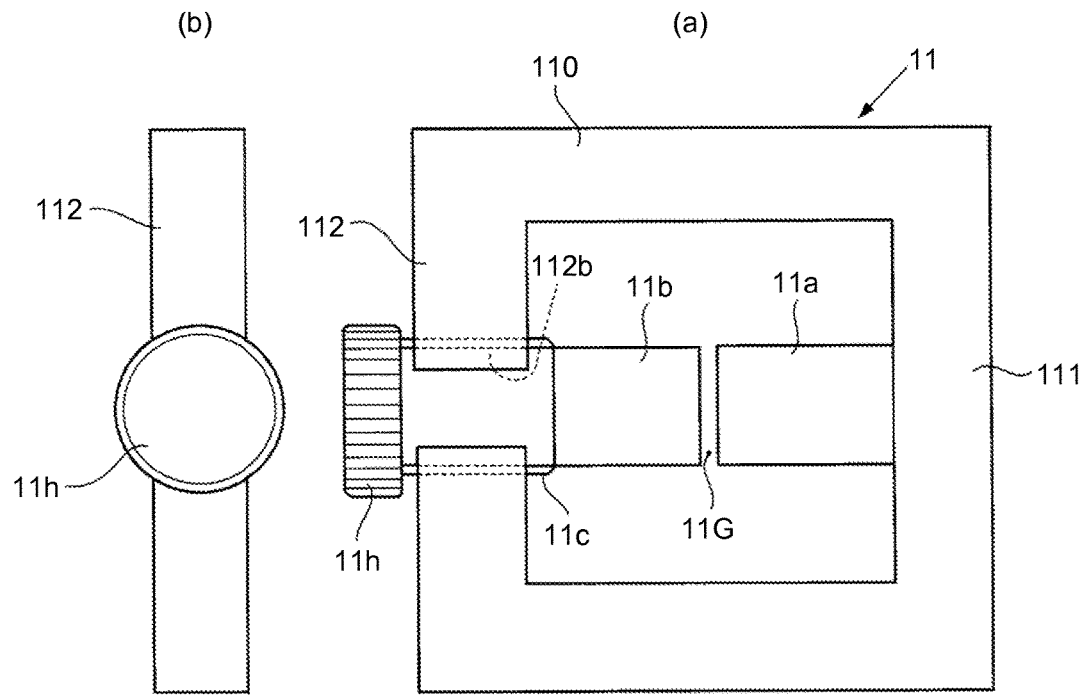
FIG. 9 illustrates front and left side views of the core including a gap adjusting unit according to a second example.
Figure 11:
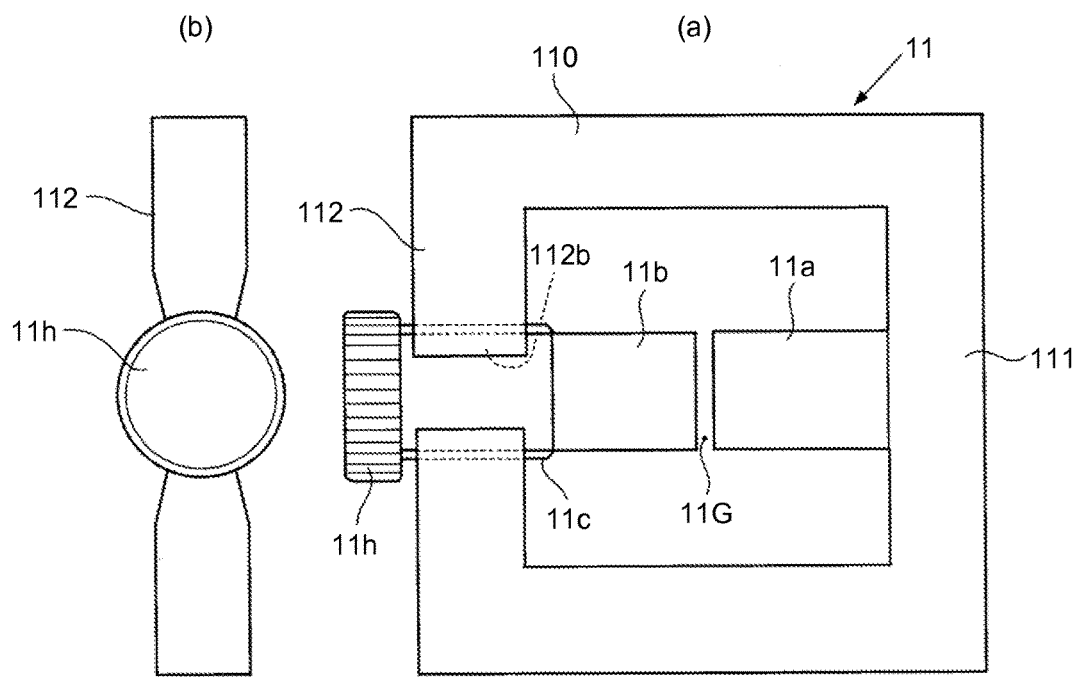
FIG. 11 illustrates front and left side views of the core including a gap adjusting unit according to a fourth example.

In the second, fourth, and sixth examples illustrated in FIGS. 9, 11, and 13, a knob portion 11h that can be gripped and rotated with fingers is provided on the end portion of the movable inner-leg portion 11b on the side not facing the fixed inner-leg portion 11a. The knob portion 11h has an outside diameter larger than an outside diameter of the movable inner-leg portion 11b. Anti-slip processing, such as knurling, is desirably applied to an outer peripheral surface of the knob portion 11h.

These examples allow rotating the movable inner-leg portion 11b by gripping the knob portion 11h with fingers, so that the size of the gap 11G (gap length) can be adjusted easily.

The knob portion 11h can be used as a dial when scale markings indexed to sizes of the gap 11G, arrows indicating a gap increasing direction and a gap decreasing direction, and/or the like are provided on an end surface of the knob portion 11h.

In the first to fourth examples illustrated in FIGS. 8A to 11S, an area of a portion where the movable inner-leg portion 11b and the side frame portion 112 are screw-joined is reduced. Accordingly, the movable inner-leg portion 11b can be rotated with a relatively small force. Furthermore, a portion of the outer peripheral surface where the external thread 11c is formed is exposed from a side surface of the side frame portion 112. This configuration allows rotating the movable inner-leg portion 11b by pinching the exposed portion with fingers rather than by using a screwdriver.

In the third example illustrated in FIG. 10, the width of the side frame portion 112 decreases toward the notch having the concave curved surfaces 112a. As a result, because the area of the portion where the movable inner-leg portion 11b and the side frame portion 112 are screw-joined is further reduced, the exposed portion of the outer peripheral surface of the movable inner-leg portion 11b increases. Accordingly, the movable inner-leg portion 11b can be rotated with a still smaller force, making it possible to perform adjustment easily without using a screwdriver.

In the fifth and sixth examples illustrated in FIGS. 12 to 13, the core 11 is constructed by fixing together two E-shaped core members with their three legs facing each other and with both side portions of the core members in close contact as in the example illustrated in FIG. 6. The close contact is made at the close contact surfaces 11r. Also in these examples, the core members are fixed by encircling the full perimeter of the core 11 excluding the portion of the side frame portion 112 where the internal thread 12c is formed with a non-magnetic metal band or holding frame.

This configuration is advantageous in that it becomes possible to mount the coil portion easily on the fixed inner-leg portion 11a and the movable inner-leg portion 11b of the core 11 after the coil portion is completed by coiling an output winding and an excitation winding on a bobbin in layers.

Also in the first to fourth examples illustrated in FIGS. 8 to 11, the core 11 can be made up of two core members so long as the core 11 is securely fixed and supported.

According to these examples, it is possible to adjust the size of the gap 11G steplessly by rotating the movable inner-leg portion 11b with an externally applied force even in a state where the transformer has been completed by coiling around the core and an excitation current is applied to the excitation winding. Accordingly, a desired output voltage or desired output power can be obtained through adjustment by changing the exciting inductance Lp.

More specifically, when an EER-49 (core size) core is used, the gap length needs to be adjusted in a considerably narrow range from 0.25 mm to 2.00 mm. When the gap length is 1.0 mm, the maximum allowable DC bias NI in this condition is 130 AT, which imposes restriction on the winding turns of the excitation winding and electric current to be applied to the excitation winding.

Meanwhile, as the gap length increases, the induction coefficient AL decreases and the maximum allowable DC bias NI increases. However, because the exciting inductance Lp decreases and the slope of the excitation current Id(Q) illustrated in FIG. 3 becomes steeper, the apex, i.e., the peak value, of the excitation current Id(Q) increases.

In contrast, as the gap length decreases, the peak value of the excitation current Id(Q) decreases, causing the stored energy ε to decrease as will be known from Equation (4). As a result, output power decreases.

With the high-voltage inverter illustrated in FIGS. 1 and 2 that includes the resonant transformer 10 made up of the four transformers that have identical characteristics, output power of 100 W to approximately 1 kW is obtained. The voltage of the output power varies by 0 to 2%.

In this high-voltage inverter, the gaps of the four transformers T1 to T4 that make up the resonant transformer 10 are individually adjusted so as to cause the excitation current Id(Q) to peak at a desired value. This adjustment is performed by applying the excitation current Id(Q) with a predetermined input voltage, a predetermined switching period, and a predetermined duty cycle and by monitoring the waveform of the excitation current Id(Q) using a waveform display device. By this adjustment, the gap sizes are adjusted so as to regulate the exciting inductances Lp of all the transformers T1 to T4 to a same predetermined value.

However, in reality, it is difficult to monitor current waveforms between terminals arranged with considerably small spacing in a circuit during mass production. For this reason, the adjustment is performed by monitoring a resultant output voltage.

A core of a transformer of an inverter is typically formed of ferrite, and a gap length of the core is determined in a design phase. However, some core fails to conform to a design specification due to a slight dimensional error that can occur in a ferrite sintering process. In such a case, it becomes necessary to apply corrective processing to a mirror-finished surface of an inner leg. However, this processing requires a large amount of manpower and, furthermore, it is difficult to reduce the gap length. No scheme has been available for adjusting the gap length while the transformer is actually operating with an excitation current applied thereto.

However, according to the embodiment, gap adjustment to achieve a desired output power value can be performed during inspection of the transformers or the high-voltage inverter.

Meanwhile, if the core had a gap in the both side portions of the core, not only an increase in leakage flux which results in a decrease in Q (sharpness of resonance), but also an increase in externally emitted noise occur. For this reason, the gap is provided in the inner leg. This also should be regarded as important because the high-voltage inverter is for use in obtaining high power, high voltage.

Air gap is generally employed as the gap; however, air gap requires that a screw-thread portion for adjustment should have a certain backlash. Accordingly, to a case where highly-accurate adjustment is difficult, a configuration in which a non-magnetic cushioning material is added to a gap portion so that an elastic force is applied in a direction that enlarges the gap length may preferably be applied.

Although the embodiments of the present have been described above, the present invention is not limited thereto. For instance, the number of the discrete transformers that make up the resonant transformer may be any number larger than one.

The high-voltage inverter according to the present invention is not limited to a dielectric barrier discharge generator, but can be utilized as a power supply of a variety of apparatuses such as a high pressure discharge lamp, an electrostatic spray coater, an etching apparatus, a thin-film forming apparatus, an ozone generator, a water-containing-ozone generator, a dust collector, or a detergent-free washer.

It should be understood that a variety of changes, additions, and omissions can be made to each of the embodiments of the present invention, and each embodiment can be implemented by being appropriately combined with one or more of the other embodiments so long as no contradiction arises.

A high-voltage inverter according to the embodiments allows adjusting peak values of an output voltage to a desired value easily.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An inverter comprising:
   a transformer including
   a primary excitation winding to which an excitation current obtained by switching an input voltage through a switching device is applied during an on period of one full cycle of the switching device, and a secondary output winding from which an alternating-current voltage is output during an off period of one full cycle of the switching device, wherein
   the transformer includes n transformers having identical characteristics, exciting windings of the transformers being the primary excitation winding and being connected in parallel, output windings of the transformers being the secondary output winding and being connected in series, the transformer configured to store in the n transformers an excitation energy ε, wherein ε is based on an input voltage ($V_{in}$) multiplied by a time ($t_{on}$) when ε is applied during the on period of one full cycle of the switching device divided by twice the n transformers and divided by an exciting inductance of each transformer ($L_p$);

each of the transformers includes a core having an identical shape and including two inner legs each having an independent closed magnetic circuit, the two inner legs extending in a direction toward each other and parallel to two sides of the core and separated by a distance (d),
the excitation winding and the output winding are wrapped around the inner leg of the core in layers, and
the inverter comprises an adjustment mechanism configured to steplessly adjust the distance between facing end surfaces of the inner legs,
wherein the distance between facing end surfaces of the inner legs in each of the transformers is adjustable relative to the core of the respective transformer,
the adjustment mechanism is configured to regulate the exciting inductances Lp of the n transformers to a same value, and
the same value is based on a peak value of the excitation current (Id(Q)) at which desired output power is obtained, the peak value of Id(Q) in the n transformers being based on Vin/Lp.

2. The inverter according to claim 1, wherein
the core of each transformer includes a rectangular frame, a cylindrical fixed inner-leg portion, and a cylindrical movable inner-leg portion,
the frame includes two parallel sides and two other sides,
the movable inner-leg portion is screwed into one of the two parallel sides, and
an end portion of the movable inner-leg portion on a side not facing the fixed inner-leg portion is configured to be rotatably operated from outside.

3. The inverter according to claim 2, wherein the adjustment mechanism further comprises a slot configured to receive at least one of a flat-blade screwdriver or a Phillips screwdriver, the slot being recessed in an end surface of the end portion of the movable inner-leg portion on the side not facing the fixed inner-leg portion.

4. The inverter according to claim 2, further comprising a knob portion, configured for rotation by hand, on the end portion of the movable inner-leg portion on the side not facing the fixed inner-leg portion.

5. The inverter according to claim 1, wherein the adjusting mechanism is further configured to adjust a resistance of the core.

6. The inverter according to claim 1, further comprising a coil portion including a plurality of layers of windings.

7. The inverter according to claim 1, wherein adjusting the distance causes a magnetic resistance of each magnetic circuit to be adjusted.

8. The inverter according to claim 1, wherein the transformer includes a plurality of magnetic circuits.

9. The inverter according to claim 1, further comprising:
a non-magnetic cushioning material inserted in between facing surfaces of the inner legs, the non-magnetic cushioning material configured to apply an elastic force in a direction that enlarges the distance between the facing surfaces.

10. A method for regulating exciting inductances of a n transformers within an inverter, the method comprising:
simultaneously exciting primary windings of the n transformers, the primary windings being connected in parallel, each of the n transformers comprising, a core including a first leg and a second leg separated from each other by a distance,
storing in the n transformers an excitation energy ε, wherein ε is based on an input voltage ($V_{in}$) multiplied by a time ($t_{on}$) when ε is applied during an on period of one full cycle of the switching device divided by twice the n transformers and divided by an exciting inductance of each transformer ($L_p$);
time-synchronizing waveforms of output voltages of secondary windings of the n transformers,
adjusting the distance between the first leg and the second leg relative to the core to regulate the exciting inductance to regulate exciting inductances L of the n transformers to a same value, and
the same value is based on a peak value of excitation current (Id(Q)) at which desired output power is obtained, the peak value of Id(Q) in the n transformers being based on an input voltage ($V_{in}$) divided by $L_p$.

11. The method for regulating exciting inductances of a n transformers within an inverter in claim 10,
wherein each of the n transformers comprises a frame, and
wherein the first leg is fixed relative to the frame and the second leg is movable relative to the frame.

12. The method for regulating exciting inductances of a n transformers within an inverter in claim 10,
wherein each of the n transformers comprises an adjustment mechanism, the method further comprising,
actuating the adjustment mechanism to adjust the distance between the first leg and the second leg.

13. The method for regulating exciting inductances of a n transformers within an inverter in claim 12, wherein
the adjusting the distance is done to the n transformers to a same value, which depends on a peak value of the excitation current at which desired output power is obtained.

14. The method for regulating exciting inductances of n transformers within an inverter according to claim 10, wherein the transformer includes a non-magnetic cushioning material inserted in between facing surfaces of inner legs, the non-magnetic cushioning material configured to apply an elastic force in a direction that enlarges the distance between the facing surfaces.

15. An inverter comprising:
a transformer including a primary excitation winding to which an excitation current obtained by switching an input voltage through a switching device is applied during an on period of one full cycle of the switching device, and a secondary output winding from which an alternating-current voltage is output when the switching device is off,
wherein the transformer includes a n transformers having identical characteristics, exciting windings of the transformers being the primary excitation winding and being connected in parallel, output windings of the transformers being the secondary output winding and being connected in series, the transformer configured to store in the n transformers an excitation energy ε, wherein ε is based on an input voltage ($V_{in}$) multiplied by a time ($t_{on}$) when ε is applied during the on period divided by twice the n transformers and divided by an exciting inductance of each transformer ($L_p$);
each of the transformers includes a core having an identical shape and including an adjustment mechanism and two inner legs each having an independent closed magnetic circuit, the two inner legs extending in a direction toward each other and parallel to two sides of the core and separated by a distance (d), a full perimeter of the core, excluding a portion of the core comprising the adjusting mechanism, encircled by a holding frame;
the excitation winding and the output winding are wrapped around the inner leg of the core in layers, and wherein the adjustment mechanism is configured to steplessly adjust the distance between facing end surfaces of the inner legs, wherein the distance between facing end surfaces of the inner legs in each of the transformers is adjustable relative to the core of the respective transformer, the adjustment mechanism is configured to regulate the exciting inductances Lp of the n transformers to a same value, and the same value is based on a peak value of an excitation current Id(Q) at which desired output power is obtained, the peak value of Id(Q) in the n transformers being based on Vin/Lp.

16. The inverter according to claim 15, further comprising:

a non-magnetic cushioning material inserted in between other facing surfaces of the inner legs, the non-magnetic cushioning material configured to apply an elastic force in a direction that enlarges the distance between the other facing surfaces.

* * * * *